Sept. 8, 1964    J. M. HUNTOON    3,147,846
FRUIT DEPOSITING MECHANISMS
Filed Sept. 16, 1960    3 Sheets-Sheet 1
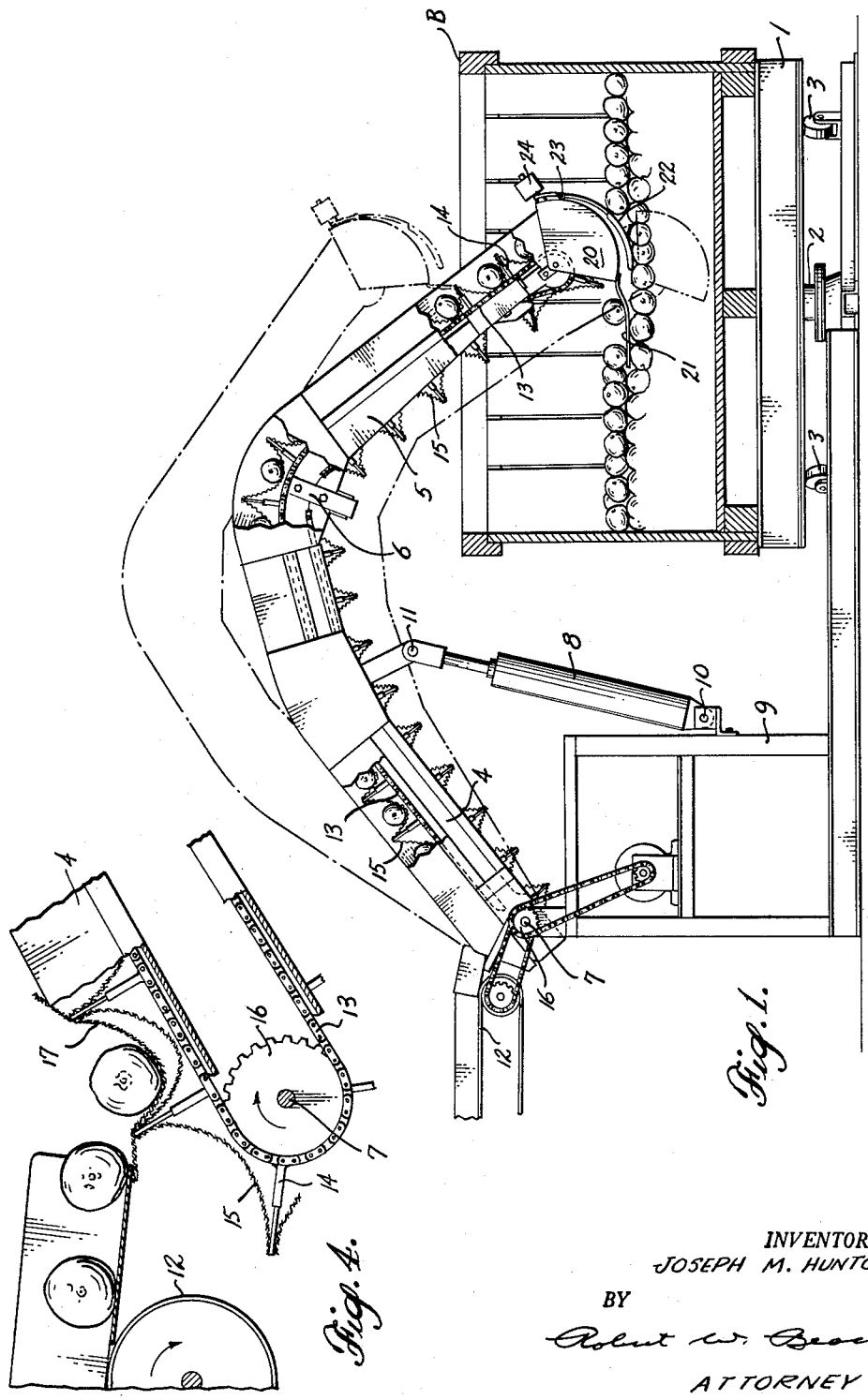
INVENTOR.
JOSEPH M. HUNTOON
BY
Robert W. Beach
ATTORNEY

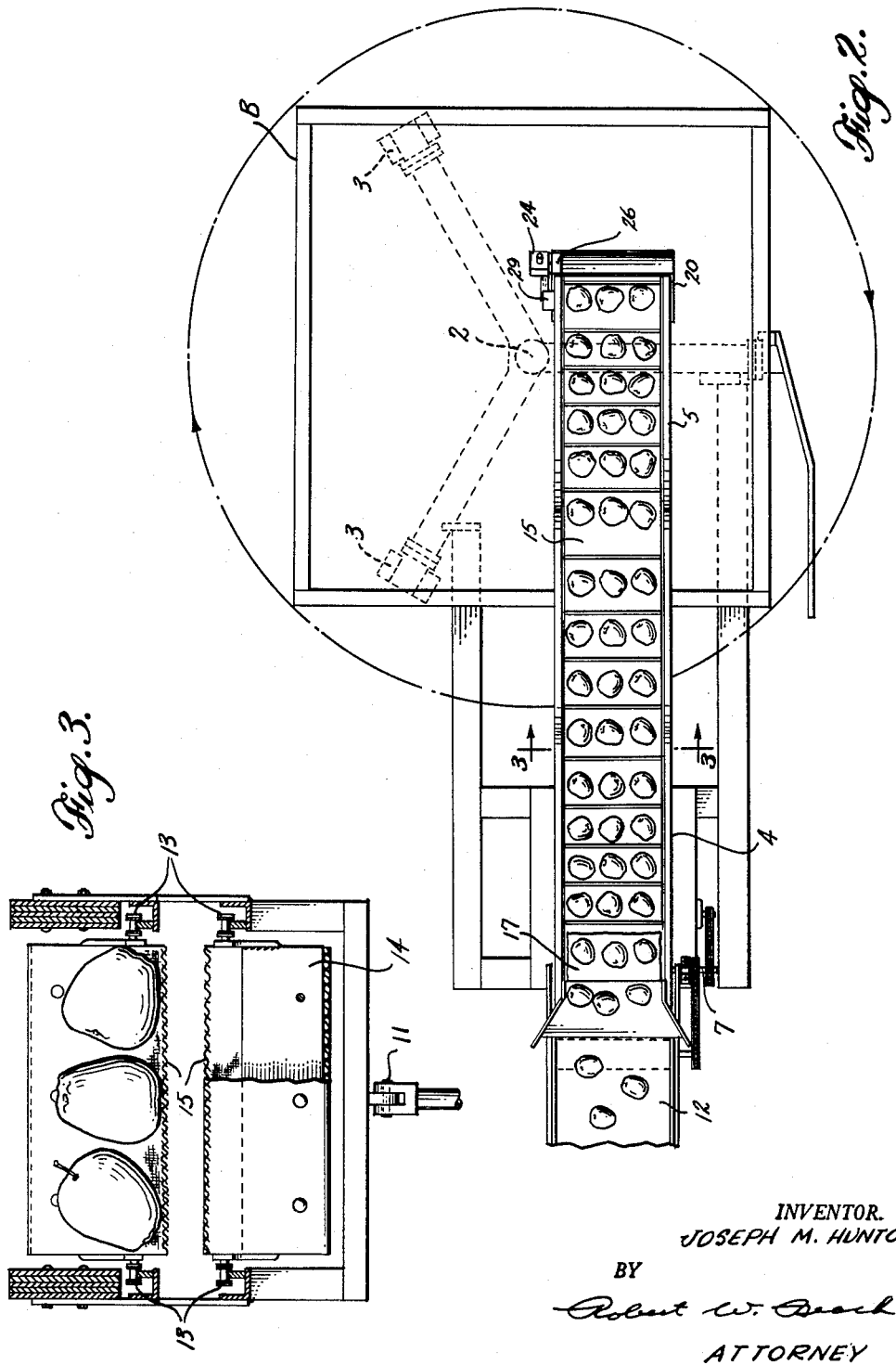

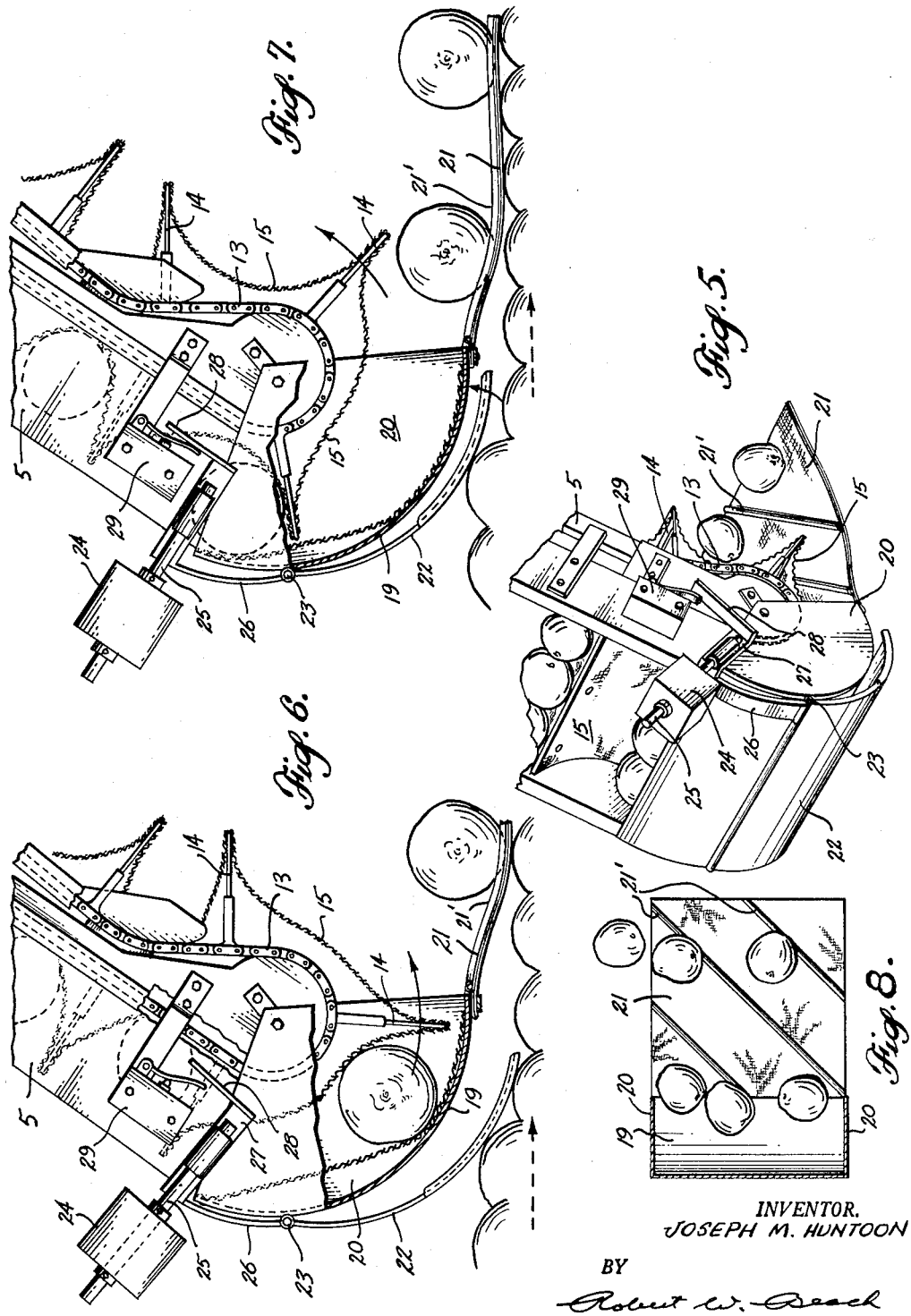

United States Patent Office 3,147,846
Patented Sept. 8, 1964

3,147,846
FRUIT DEPOSITING MECHANISMS
Joseph M. Huntoon, 2310 Fruitvale Blvd., Yakima, Wash.
Filed Sept. 16, 1960, Ser. No. 56,461
5 Claims. (Cl. 198—99)

This invention relates to mechanism for depositing fruit and in particular such mechanism which can be used to fill a receptacle, such as a bin, with fruit.

It is a principal object of the present invention to provide such fruit depositing mechanism which will lower delicate fruit, such as applies, gently but quickly and automatically so that a receptacle, such as a fruit bin, can be filled without the aid of hand labor. In thus filling a receptable, it is an important object that the fruit not be dropped or rolled forcefully so that it will bump other fruit or the sides of the receptacle with appreciable force which might tend to damage the fruit.

In order to avoid dropping the fruit, it is an object to alter the relative elevation of the receptacle and the fruit depositing mechanism so that such mechanism will always be at or just slightly above the level of the fruit surface in the receptacle. It is desirable to accomplish this object automatically so that attention of a workman will not be required for this purpose, the relative elevation will be regulated as appropriate within close limits, and there will be no risk of the fruit being dropped because of poor judgment or inattention of an operator.

An additional object is to provide mechanism for filling a receptacle, such as a mobile fruit bin, which can be maneuvered quickly to enable a bin to be put in position for filling easily and to be removed as readily when it is filled to be replaced by an empty bin.

Another object is to provide such mechanism which will distribute the fruit reasonably uniformly over a bin of considerable horizontal area instead of depositing the fruit all in one portion of the bin so that it must be distributed by rolling considerable distances into other portions of the bin or moved by a workman.

Fruit depositing mechanism suitable for accomplishing the foregoing objects includes a turntable for rotatively supporting a receptacle into which fruit is deposited and a conveyor of angle shape including a generally horizontal stretch swingable about a pivot mount supporting one end and having a generally upright conveyor stretch depending from the other end of such generally horizontal stretch to be lowered into the receptacle in a position offset from the rotative axis of the turntable. Swinging of the conveyor to effect elevational adjustment of the upright stretch is accomplished by elevating mechanism under the control of sensing mechanism on the lower end of the upright stretch of the conveyor, which senses the elevation of the bed of fruit onto which additional fruit is to be placed by the depositing mechanism.

FIGURE 1 is a side elevation view of the depositing mechanism with a bin and the turntable on which it is mounted being shown in section.

FIGURE 2 is a plan view of the mechanism, and FIGURE 3 is a transverse sectional view through the depositing conveyor on the line 3—3 of FIGURE 2.

FIGURE 4 is an enlarged detail elevation view of the feed end portion of the depositing conveyor.

FIGURE 5 is a top perspective view of the lower end portion of the upright leg of the depositing conveyor, and FIGURE 6 is a side elevation view of the same portion of the upright conveyor leg. FIGURE 7 is a side elevation view similar to FIGURE 6 but showing parts in different positions.

FIGURE 8 is a horizontal sectional view through the lower part of the upright leg of the depositing conveyor.

In general, the problem solved by the present invention is that of depositing delicate fruit gently and automatically in a receptacle of considerable size. Fruit bins customarily used for storing apples, for example, are approximately four feet square and two feet deep internally. When loaded, such bins are transported by fork lift trucks. Consequently, it is unsatisfactory to deposit the fruit in only one location in the bin because it is likely to be bruised by striking other fruit or the sides of the bin in rolling down from a mound of the fruit. Moreover, such fruit does not roll very readily unless the mound is reasonably high, which would prevent a bin being filled automatically to a substantially level condition. There is the further problem of depositing the fruit gently onto other fruit in the bin irrespective of the depth of the fruit. It is very undesirable to drop the fruit even one foot because, while bruises would not appear immediately, they would be very likely to show up eventually and even slight bruises both detract from the keeping qualities of the fruit and lower the grade of the fruit.

Good distribution of the fruit in a bin generally of the size mentioned above can be accomplished by rotating the bin and depositing the fruit into it at a location generally midway between the axis about which the bin is rotated and the side wall of the bin. In FIGURE 1 the bin B is shown supported on a turntable 1 which is rotated about the axis of a central support 2 by suitable drive mechanism which is not shown. The turntable is rotatively supported by rollers 3 which turn about axes extending radially from the rotative axis 2. The speed at which the turntable will be rotated depends upon the rate at which fruit is deposited in the bin. Preferably the speed of rotation is such as to enable one continuous layer of fruit to be laid in the bin from its central portion to the bin sides during one rotation of the turntable.

The fruit depositing conveyor is of generally angle shape and includes a supporting generally horizontal leg or stretch and a supported generally upright leg or stretch depending from the supporting leg which preferably are fixed relative to each other. The generally horizontal leg includes a frame 4 and the generally upright leg includes a frame 5 connected by a rigid joint 6 which holds the frame members 4 and 5 in substantially perpendicular relationship. Actually, it is preferred that the central portion of the leg 4 be bowed upward somewhat to afford better clearance for the edge of the bin B. Such bowed shape can be effected by curving the frame 4 or by forming it of two or more sections secured together at a dihedral angle. In FIGURE 1 the generally horizontal leg 4 is shown as being formed of two sections forming a dihedral angle.

In order to load fruit into the bin B gently from its bottom to its top, it is necessary to provide relative elevational adjustment of the bin and the lower end of the generally upright conveyor leg. It is preferred that the change in elevation be effected by moving the upright leg of the depositing conveyor rather than by changing the elevation of the bin B. The height of the lower end of the depositing conveyor's upright leg can be altered conveniently by mounting the end of the conveyor's generally horizontal leg on a horizontal pivot 7 about which the entire conveyor can swing in a vertical plane. The actuator 8 variable in effective length cooperates with the pivot 7 to support and guide the conveyor for swinging movement. Such actuator, which preferably is of the fluid pressure piston-and-cylinder type, extends between a support 9 and a portion of the conveyor spaced from the pivot 7. The actuator is mounted on the support by pivot 10 and is connected to the conveyor by pivot 11 so as to be able to move angularly both relative to the support and to the conveyor as the actuator is varied in effective length to effect swinging of the conveyor about pivot 7.

In FIGURE 1, the depositing conveyor is shown in a position such that the lower end of its generally upright leg is in position to deposit fruit gently in a bin which is approximately half full. The actuator 8 can be shortened to lower the conveyor to the lower broken line position in which the lower end of the upright leg is disposed adjacent to the bottom of the bin B, and the actuator can be extended to swing the conveyor upward about its pivot 7 into the upper broken line position in which the lower end of the generally upright leg is disposed sufficiently above the upper edge of bin B to enable a fork lift truck to lift the bin easily off the turntable 1 and to place another bin on such turntable. Actually, when the conveyor is in that position, the leg including the frame member 5, which has been designated as generally upright, may be more nearly horizontal than the supporting leg 4 which has been designated as being generally horizontal. The particular spaced disposition of these legs will depend somewhat on the elevation of the supply conveyor 12 which feeds the fruit to the depositing conveyor but in normal operation the supported leg including frame 5 will be more nearly upright than the supporting leg including the frame 4, as shown in solid lines in FIGURE 1.

The depositing conveyor includes chains 13 of endless character extending around guides so that one stretch of each chain 13 extends above the conveyor frame members 4 and 5 and another stretch extends below such frame members. As shown in FIGURE 3, two of such chains in spaced vertical planes preferably are provided and between these chains extend pocket divider plates 14 having their opposite ends connected to the respective chains to hold such bars in positions perpendicular to the chains and path of movement of the conveyor. A flexible strip 15, preferably of fabric, is draped over these bars along the length of the depositing conveyor to form flexible pockets between the bars for receiving fruit. As the chains turn around a guide, such as the sprocket 16 mounted concentric with the pivot 7, the divider plates will be disposed in radial planes of the sprocket so that the outer edges of adjacent bars will be spread farther apart. The loops of the strip 15 between such bars will be of sufficient length so as not to interfere with such separating movement of the divider plates 14. Preferably the strip is secured to the outer edge portion of each of the plates so that the pockets formed by the strip will be equal in size throughout the length of the conveyor. The plates 14 will be spaced apart sufficiently to provide pockets of adequate, though not excessive size to receive fruit between the plates and the chains may be spaced apart sufficiently to enable more than one fruit to be received in each pocket. In FIGURE 3 three apples are shown in a pocket.

The supported end of the supporting conveyor leg mounted on pivot 7 is located adjacent to the discharge end of the supply conveyor 12. The adjacent ends of these conveyors should be correlated so that fruit can be transferred from the supply conveyor 12 to the depositing conveyor without damage to the fruit in whatever elevational position the depositing conveyor may be. A flap 17 is provided to extend between the supply conveyor and the adjacent end of the depositing conveyor. This flap being of flexible material will drape over the adjacent end of the depositing conveyor to be engaged by each of the pocket divider plates 14 as it passes beneath the flap. If fruit is on the flap, its weight will depress the portion of the flap beyond the divider engaging it down into the pocket of the depositing conveyor ahead of such divider. As the divider continues to move, therefore, the flap 17 will be withdrawn from the pocket and the fruit will be transferred from the supply conveyor flap into the depositing conveyor pocket very gently. The fruit will then be transported along the upper side of the depositing conveyor in such pocket until it reaches the lower end portion of the supported generally upright leg of the depositing conveyor.

The pockets of the depositing conveyor should be sufficiently deep or flexible or formed so that the fruit will not roll out of such pockets until they approach the lower end portion of the generally upright supported leg of the conveyor. The lower end portion of the depositing conveyor has a shield 18 extending sufficiently along its side remote from the supply end of the conveyor to prevent fruit from rolling out of the conveyor pockets before it reaches the lower end portion of the generally upright leg.

Provision must be made to lay the fruit onto the bin bottom or fruit previously deposited in the bin instead of dropping the fruit in order to avoid bruising either the fruit being deposited or the fruit already in the bin. As the conveyor pockets are progressively inverted by movement of the pocket dividers 14 around the lower end of the depositing conveyor's upright leg, the fruit rolls gently onto a curved plate 19 shown in FIGURES 6 and 7 carried by side plate 20. As shown, the curvature of this plate is concentric with the path of movement of the pocket dividers 14 around the lower end of the supported leg frame member 5 to a location below the lower end of such upright leg. The manner in which the fruit rolls onto such plate is shown best in FIGURE 7. As fruit begins to roll from a depositing conveyor pocket onto the plate 19, the weight of the fruit will be transferred gradually from the conveyor divider 14 ahead of it onto such plate until the entire weight of the fruit is borne by the plate. The fruit then continues to roll down the plate as shown in FIGURE 6, but such rolling movement is retarded by engagement of the fruit with the divider 14 ahead of it.

When the divider ahead of the fruit finally moves upward out of the path of the fruit on the return stretch of the conveyor, as shown in FIGURE 7, the fruit will continue to roll down the gentle incline of the plate 19 onto a flexible apron 21, preferably made of fabric, which is attached to the lower edge of the plate 19 and extends in continuation of such plate. This apron lies on and is supported by either the bin bottom or fruit already in the bin. Such apron has on it flexible ribs 21' arranged in substantially parallel relationship at an angle to the direction of movement of the fruit. Fruit engaging such ribs is deflected by them toward the periphery of the bin B. Such ribs can be formed conveniently by pieces of rope sewed between two sheets of canvas forming the apron.

As has been mentioned, it is desirable to regulate the position of the lower end of the generally upright conveyor leg elevationally in the bin depending upon the depth of the fruit in the bin. Such elevation can be controlled by providing a sensing element to sense the surface of the body of fruit in the bin and the plate 22 can be used as such sensing element by mounting it movably on the depositing conveyor. This plate is shown as mounted swingably by pivot 23 connecting its upper edge to the lower end portion of the depositing conveyor, as shown in FIGURES 1, 5, 6 and 7. A counterweight 24 is adjustable along rod 25 carried by the strap 26 which is attached to the plate 22 so as to balance approximately the weight of such plate acting about the axis of pivot 23. Such counterweight preferably is adjusted so as to balance most of the weight of plate 22, enabling a very gentle pressure on the bottom of such plate to swing it upwardly as indicated by the arrow in FIGURE 7.

Engagement of strap 26 with plate 19 which it overlies serves as a stop to limit downward swinging of plate 22. Such strap also carries a bracket 27 having a foot 28 engageable with a control switch 29 when the plate 22 is swung upward far enough. This control switch is in circuit with a motor driving a suitable pump to supply fluid under pressure, such as liquid, to the actuator 8. Such pump is also controllable manually, however, to enable the actuator to be moved for adjusting its effective length independently of the actuation of switch 29 by upward movement of plate 22.

In operation, the actuator 8 will be extended to move the depositing conveyor into its upper broken line position shown in FIGURE 1. A bin B will then be placed on the turntable 1 and, by manual control, the actuator 8 will be reduced in effective length until the depositing conveyor is lowered to its lowermost position shown in broken lines in FIGURE 1. Rotation of turntable 1 can then be started and supply conveyor 12 and the depositing conveyor can also be started. Under these conditions the swinging edge of plate 22 should drag on the bin bottom. The turntable may be mounted shiftably to some extent, if desired, so as to locate the lower end of the depositing conveyor generally upright leg in the proper position between the rotative axis of the turntable and the bin wall depending upon the size of the bin.

After the first layer of fruit has thus been laid in the bottom of the rotating bin the bottom of plate 22 will encounter such fruit layer when the bin has made a complete revolution. Immediately this plate will be swung upward to move bracket 28 into engagement with switch 29 so as to initiate extension movement of the actuator 8. Such extension movement will continue until the depositing conveyor has swung upwardly sufficiently to enable the swinging end of plate 22 to drop sufficiently so that bracket 28 will release switch 29. The next layer of fruit will thus be laid on the first layer by the plate 19 and the apron 20 without the fruit being dropped and the depositing conveyor will remain at such elevation until the turntable has completed its second revolution. Thereupon the second layer of fruit will engage the lower side of plate 22 to swing it upward for effecting the next upward increment of movement of the depositing conveyor by energization of actuator 8. The conveyor will then remain in that position as the bin continues to be turned until the third layer of fruit has been deposited.

It should be understood that the fruit is not laid in the bin in precise layers because, depending upon the relative speed of fruit delivery by the depositing conveyor and the speed of rotation of the turntable 1, it may be that an incomplete layer of fruit will be deposited during one revolution of the bin. The important point, however, is that whenever the depth of fruit in the bin is sufficiently great so that plate 22 is engaged by such fruit and swung upward sufficiently to cause bracket 28 to engage switch 29, the actuator 8 will be energized to swing the depositing conveyor upward until the lower end of the conveyor's generally upright leg is slightly above the surface of the bed of fruit in the bin. This relationship between the surface of the bed of fruit and the lower end of the depositing conveyor's generally upright leg will be maintained by progressive automatic upward swinging of the conveyor as the bin filling operation continues so that the fruit will always be laid gently on the surface of the body of fruit in the bin until the bin has been filled sufficiently, when the conveyors and turntable will be stopped. By manual operation the actuator 8 can then again be extended to swing the conveyor into the upper broken line position shown in FIGURE 1 so that the filled bin B can be removed from the turntable 1 by a lift truck and the next empty bin placed on the turntable for filling.

I claim as my invention:

1. Fruit bin filling mechanism comprising a fruit bin, fruit-supplying means at approximately the same height as the rim of said bin, fruit-depositing means including a frame of generally right angle shape having a supporting leg one portion of which is adjacent to said fruit-supplying means and a supported leg extending downward from said supporting leg to a lower fruit-discharging portion in said bin, conveyor guide means carried by said frame, an endless conveyor extending around said frame and guided by said conveyor guide means, pocket dividers carried by said endless conveyor in positions projecting substantially perpendicularly from the path of said conveyor and movable thereby from said fruit-supplying means along the upper side of said supporting leg, downward along the side of said supported leg remote from said supporting leg, around the lower end of said supported leg, upward along the side of said supported leg adjacent to said supporting leg and beneath said supporting leg back to said fruit-supplying means, flexible sheet means draped between said pocket dividers and forming conveyor pockets between the pocket dividers moving downwardly at the side of said supported leg remote from said supporting leg for conveying fruit therein, a plate mounted on and curving downward around the lower end of said supported leg concentrically with the path of movement of said pocket dividers moving around the lower end of said supported leg and adjacent to said pocket dividers to a location beneath the lower end of said supported leg and cooperating with said pocket dividers to prevent passage of fruit between said plate and said pocket dividers, for transfer of fruit from said conveyor pockets to said plate gently without impact, a flexible apron extending from the lower portion of said plate in a position overlying and supported by fruit in said bin, moving means operatively connected to said fruit-depositing conveyor and operable to move said conveyor for shifting the lower fruit-discharging portion of said supported leg elevationally which varies the elevation at which fruit is deposited by said fruit-depositing conveyor, a pivoted control member mounted on said fruit-discharging portion of said supported leg below the lower portion of said plate, curved generally corresponding to the curvature of said plate and swingable downward relative to said plate for engagement with fruit in said bin on which additional fruit is to be deposited by said conveyor, counterbalancing means connected to said control member and balancing most of the weight thereof, and control means operated by predetermined swinging of said control member relative to said supported leg and operatively connected to said moving means to effect movement of said conveyor to alter the elevation of said lower fruit-discharging portion of said supported leg.

2. Fruit bin filling mechanism comprising a fruit bin, fruit-depositing means including a frame having a supporting leg and a supported leg extending downward from said supporting leg to a lower fruit-discharging portion in said bin, conveyor guide means carried by said frame, an endless conveyor extending around said frame and guided by said conveyor guide means, pocket dividers carried by said endless conveyor in positions projecting substantially perpendicularly from the path of said conveyor and movable thereby from the upper side of said supporting leg downward along the side of said supported leg remote from said supporting leg, around the lower end of said supported leg and upward along the side of said supported leg adjacent to said supporting leg back toward said supporting leg, flexible sheet means draped between said pocket dividers and forming conveyor pockets between the pocket dividers moving downwardly at the side of said supported leg remote from said supporting leg for conveying fruit therein, a plate mounted on and curving downward around the lower end of said supported leg concentrically with the path of movement of said pocket dividers moving around the lower end of said supported leg and adjacent to said pocket dividers to a location beneath the lower end of said supported leg and cooperating with said pocket dividers to prevent passage of fruit between said plate and said pocket dividers, for transfer of fruit from said conveyor pockets to said plate gently without impact, and a flexible apron extending from the lower portion of said plate in a position overlying and supported by fruit in said bin.

3. Fruit bin filling mechanism comprising a fruit bin, fruit-depositing means including a frame having a supporting leg and a supported leg extending downward from said supporting leg to a lower fruit-discharging portion in said bin, conveyor guide means carried by said frame, an endless conveyor extending around said frame and guided by said conveyor guide means, pocket dividers carried by said endless conveyor in positions projecting from the path of said conveyor and movable thereby from the upper side of said supporting leg downward along said supported leg, around the lower end of said supported leg and upward along said supported leg back toward said supporting leg, flexible sheet means draped between said pocket dividers and forming conveyor pockets between the pocket dividers moving downwardly along said supported leg for conveying fruit therein, and a plate mounted on and curving downward around the lower end of said supported leg concentrically with the path of movement of said pocket dividers moving around the lower end of said supported leg and adjacent to said pocket dividers to a location beneath the lower end of said supported leg and cooperating with said pocket dividers to prevent passage of fruit between said plate and said pocket dividers, for transfer of fruit from said conveyor pockets to said plate gently without impact.

4. Article-depositing mechanism comprising article-depositing means including a frame having a depending portion with a lower article-discharging end, conveyor guide means carried by said frame, an endless conveyor extending around said frame and guided by said conveyor guide means, pocket dividers carried by said endless conveyor, movable thereby around the lower end of said depending conveyor portion and defining article-conveying pockets therebetween, and a plate mounted on and curving downward around the lower end of said depending conveyor portion concentrically with the path of movement of said pocket dividers moving around the lower end of said depending conveyor portion and adjacent to said pocket dividers to a location beneath said depending conveyor portion and cooperating with said pocket dividers to prevent passage of articles between said plate and said pocket dividers, for transfer of articles from said article-conveying pockets to said plate gently without impact.

5. Article-depositing mechanism comprising an article receiver, article-depositing means including a frame having a supporting leg and a supported leg extending downward from said supporting leg to a lower article-discharging portion, article-conveying means supported from and movable downward around the lower end of said supported leg, a plate mounted on and curving downward around the lower end of said supported leg concentrically with the path of movement of said article-conveying means to a location below the lower end of said supported leg and cooperating with said article-conveying means to limit the speed of movement of articles along said plate to the speed of movement of said article-conveying means.

References Cited in the file of this patent

UNITED STATES PATENTS

| | | |
|---|---|---|
| Re. 17,769 | Morris | Aug. 12, 1930 |
| 1,617,490 | Knox | Feb. 15, 1927 |
| 1,767,442 | Evans et al. | June 24, 1930 |
| 2,506,779 | Criger | May 9, 1950 |
| 2,800,991 | Mannierre | July 30, 1957 |
| 2,956,668 | Fioravanti | Oct. 18, 1960 |

FOREIGN PATENTS

| | | |
|---|---|---|
| 459,899 | Great Britain | Jan. 18, 1937 |
| 705,378 | Great Britain | Mar. 10, 1954 |